(12) United States Patent
Mooney et al.

(10) Patent No.: US 8,869,823 B2
(45) Date of Patent: Oct. 28, 2014

(54) NON-RETURN VALVE

(75) Inventors: Peter Richard Mooney, Guildford (GB); Ian Edward Tilley, Market Harborough (GB)

(73) Assignee: UFPCC Services Limited (GB)

( * ) Notice: Subject to any disclaimer, the term of this patent is extended or adjusted under 35 U.S.C. 154(b) by 163 days.

(21) Appl. No.: 13/261,159

(22) PCT Filed: Jul. 26, 2010

(86) PCT No.: PCT/EP2010/060812
§ 371 (c)(1),
(2), (4) Date: Feb. 29, 2012

(87) PCT Pub. No.: WO2011/012581
PCT Pub. Date: Feb. 3, 2011

(65) Prior Publication Data
US 2012/0152378 A1     Jun. 21, 2012

(30) Foreign Application Priority Data
Jul. 29, 2009 (GB) .................................. 0913189.7

(51) Int. Cl.
*F16K 15/00* (2006.01)
*F16K 27/02* (2006.01)
*F16K 15/03* (2006.01)

(52) U.S. Cl.
CPC ............. *F16K 15/03* (2013.01); *F16K 27/0227* (2013.01)

USPC .................. 137/454.2; 137/527.8; 137/527.6; 251/356; 277/529

(58) Field of Classification Search
CPC ........... F16K 1/18; F16K 15/00; F16K 15/03; F16K 35/10
USPC ........... 137/527.6, 527.8, 454.2; 251/82, 356; 277/529, 530, 644, 604
See application file for complete search history.

(56) References Cited

U.S. PATENT DOCUMENTS

| | | | | |
|---|---|---|---|---|
| 2,878,826 | A * | 3/1959 | Dolenga | 137/216 |
| 3,016,914 | A * | 1/1962 | Keithahn | 137/515 |
| 3,144,876 | A * | 8/1964 | Frye | 137/454.5 |
| 3,191,619 | A * | 6/1965 | Allen | 137/527.4 |
| 4,039,004 | A * | 8/1977 | Luthy | 137/527 |
| 5,190,224 | A * | 3/1993 | Hamilton | 239/600 |
| 2005/0279405 | A1* | 12/2005 | Martin et al. | 137/15.18 |

FOREIGN PATENT DOCUMENTS

DE      94 13 322 U1   12/1995

\* cited by examiner

*Primary Examiner* — Stephen M Hepperle
*Assistant Examiner* — R. K. Arundale
(74) *Attorney, Agent, or Firm* — Ira S. Dorman

(57) ABSTRACT

A non-return valve mechanism comprises a tubular member (1) having a substantially constant external diameter whereby the tubular member can be inserted into a pipe (5) from an open end thereof. A pivotable closure member (9) is provided at one end of the tubular member for closing the end of the tubular member, the closure member being adapted to be positioned externally of the pipe. At least one seal (3) extends around the external periphery of the tubular member for sealing with an internal surface of the pipe into which the tubular member is inserted.

20 Claims, 10 Drawing Sheets

NON-RETURN VALVE

This invention relates to a non-return valve which can be used, for example, as an anti-flood or anti-backflow valve such as may be fitted to incoming and/or outgoing domestic pipes which enter into a manhole or the like (such as an inspection chamber).

Non-return valves for manholes are known, but generally require modification of the manhole in order to be installed. Clearly any modification of a manhole can be inconvenient and expensive and should be avoided if possible. Separate non-return valves are also known, but installing such separate valves is generally more inconvenient and more expensive than modifying a manhole because such valves require to be arranged in an in-line configuration which requires a separate manhole or inspection chamber resulting in significant additional cost.

It is therefore an object of the present invention to provide a non-return valve which overcomes, or at least ameliorates, the disadvantages of known non-return valves.

According to the present invention there is provided a non-return valve mechanism comprising a tubular member having a substantially constant external diameter whereby the tubular member can be inserted into a pipe from an open end thereof, a pivotable closure member provided at one end of the tubular member for closing the end of the tubular member, the closure member being adapted to be positioned externally of the pipe, and at least one seal extending around the external periphery of the tubular member for sealing with an internal surface of the pipe into which the tubular member is inserted.

Two axially spaced seals may be provided.

The or each seal may comprise an O-ring seal mounted in a circumferential groove formed in the external surface of the tubular member. The diameter of the circumferential groove may be tapered in an axial direction of the tubular member, the diameter of the groove decreasing with increasing distance from the closure member.

The tubular member may be formed with a circumferential shoulder in a region adjacent to the closure member for abutting against an end of a pipe into which the valve mechanism is inserted.

The closure member may bear against an end of the tubular member by way of an annular seal. The seal may be mounted on the closure member. The seal may be substantially S-shaped in cross-section whereby the seal envelopes a peripheral region of the closure member and includes a radially outwardly extending flange portion for sealing against the end of the tubular member.

The valve may include a locking member adapted to releasably lock the closure member in sealing contact with the end of the tubular member. The locking member may bear against an operating arm for operating the closure member so as to lock the closure member. Alternatively, the locking member may engage with a recess formed in an operating arm for the closure member so as to lock the closure member.

The inner surface of the tubular member may be tapered at that end thereof remote from the closure member to facilitate fluid flow through the tubular member.

The tubular member may be provided with an extension tube. The extension tube may be secured to the tubular member by way of one or more catches formed on one of the extension tube and the tubular member and engaging in corresponding apertures formed in the other of the extension tube and the tubular member. The extension tube may be provided with one or more seals extending around the external periphery thereof. Two axially spaced seals may be provided. The or each seal may comprise an O-ring seal mounted in a circumferential groove formed in the external surface of the extension tube. The diameter of the circumferential groove may be tapered in an axial direction of the tubular member, the diameter of the groove decreasing with increasing distance from the closure member. The inner surface of the extension tube may be tapered at that end thereof remote from the tubular member to facilitate fluid flow through the extension tube.

Where the inner surface of the tubular member is tapered, the outer surface of the extension tube may be formed with a complementary taper such that the portion of the extension tube having the complementary external taper lies adjacent to the internal tapered region of the tubular member.

The closure member may incorporate a component of relatively higher specific gravity than the remainder of the closure member so as to urge the closure member into sealing contact with the end of the tubular member.

For a better understanding of the present invention and to show more clearly how it may be carried into effect reference will now be made, by way of example, to the accompanying drawings in which.

Figure 1:
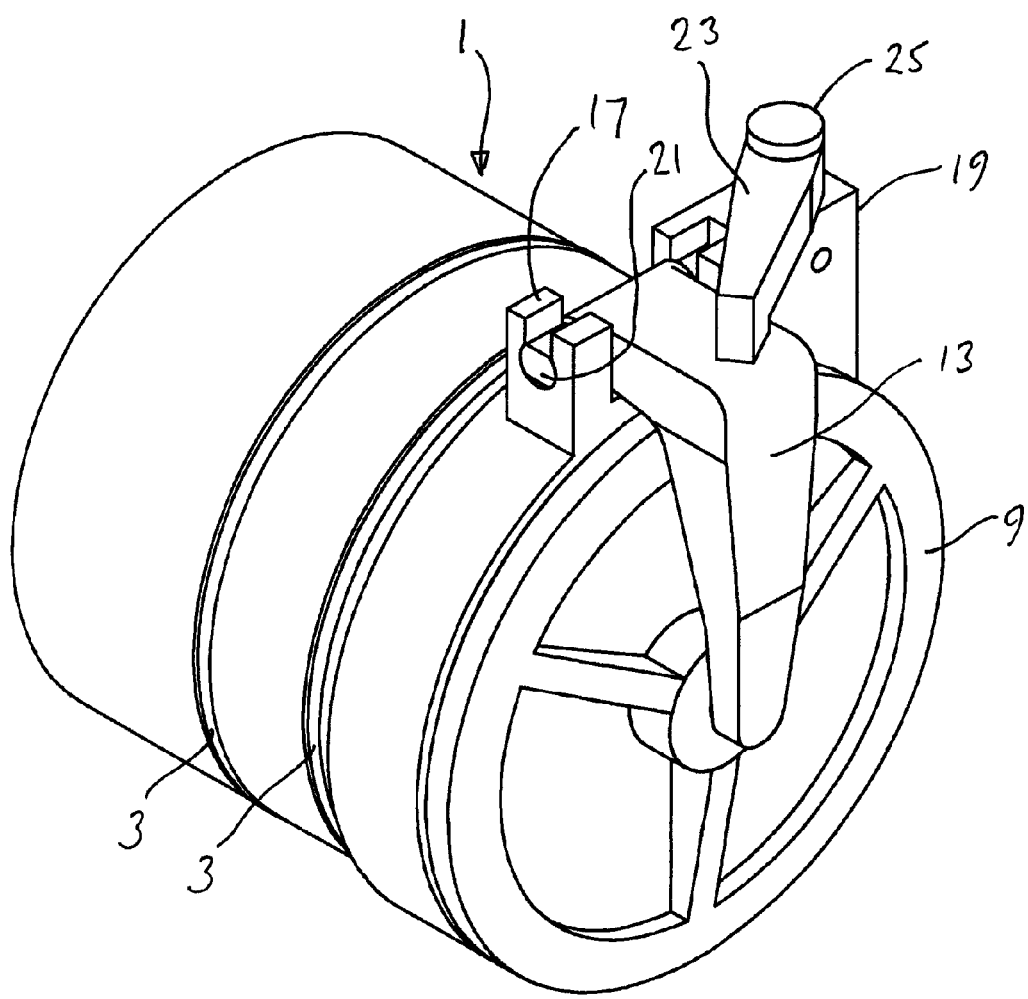
FIG. 1 is a perspective view of one embodiment of a non-return valve mechanism according to the present invention.
Figure 2:
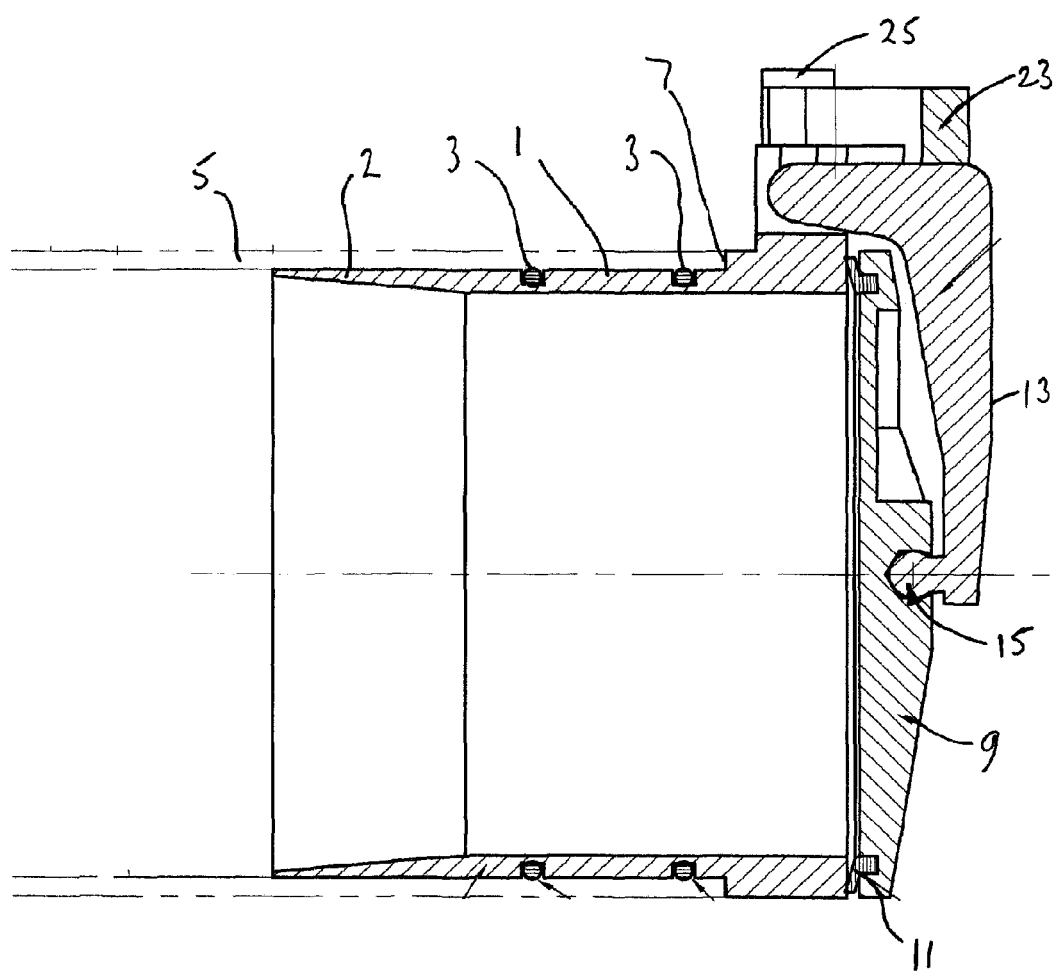
FIG. 2 is a cross-sectional view of a non-return valve mechanism shown in FIG. 1.
Figure 3:
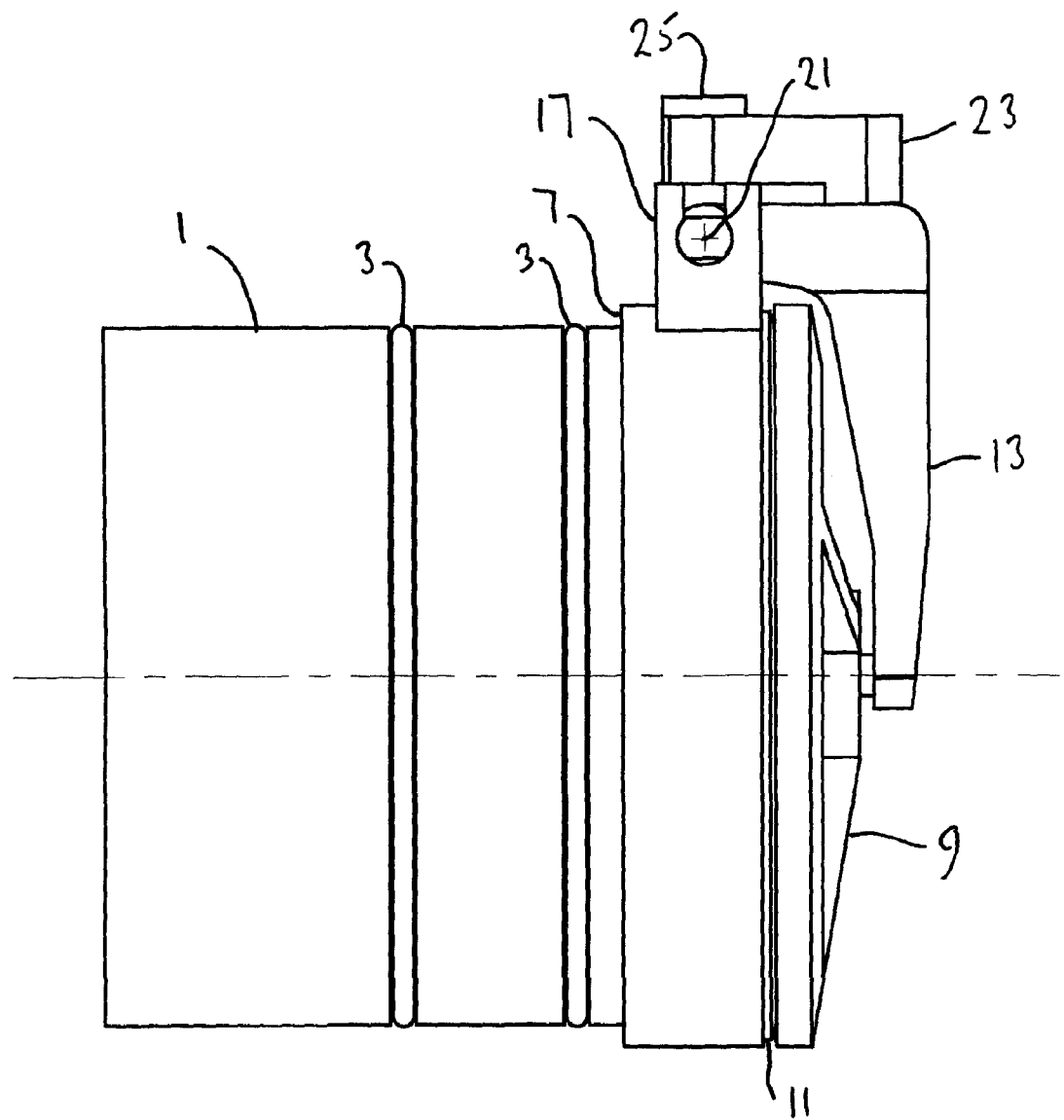
FIG. 3 is a side view of the non-return valve mechanism shown in FIG. 1 in a closed configuration.
Figure 4:
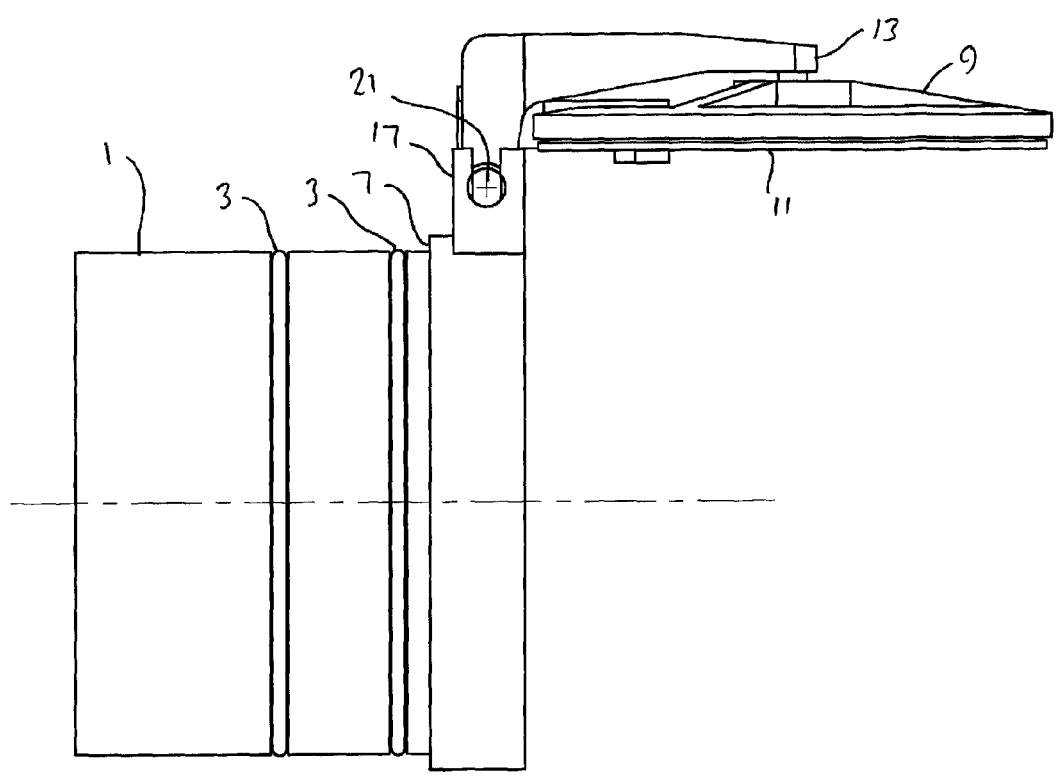
FIG. 4 is a view corresponding to FIG. 3 with the non-return valve mechanism in an open configuration.
Figure 5:
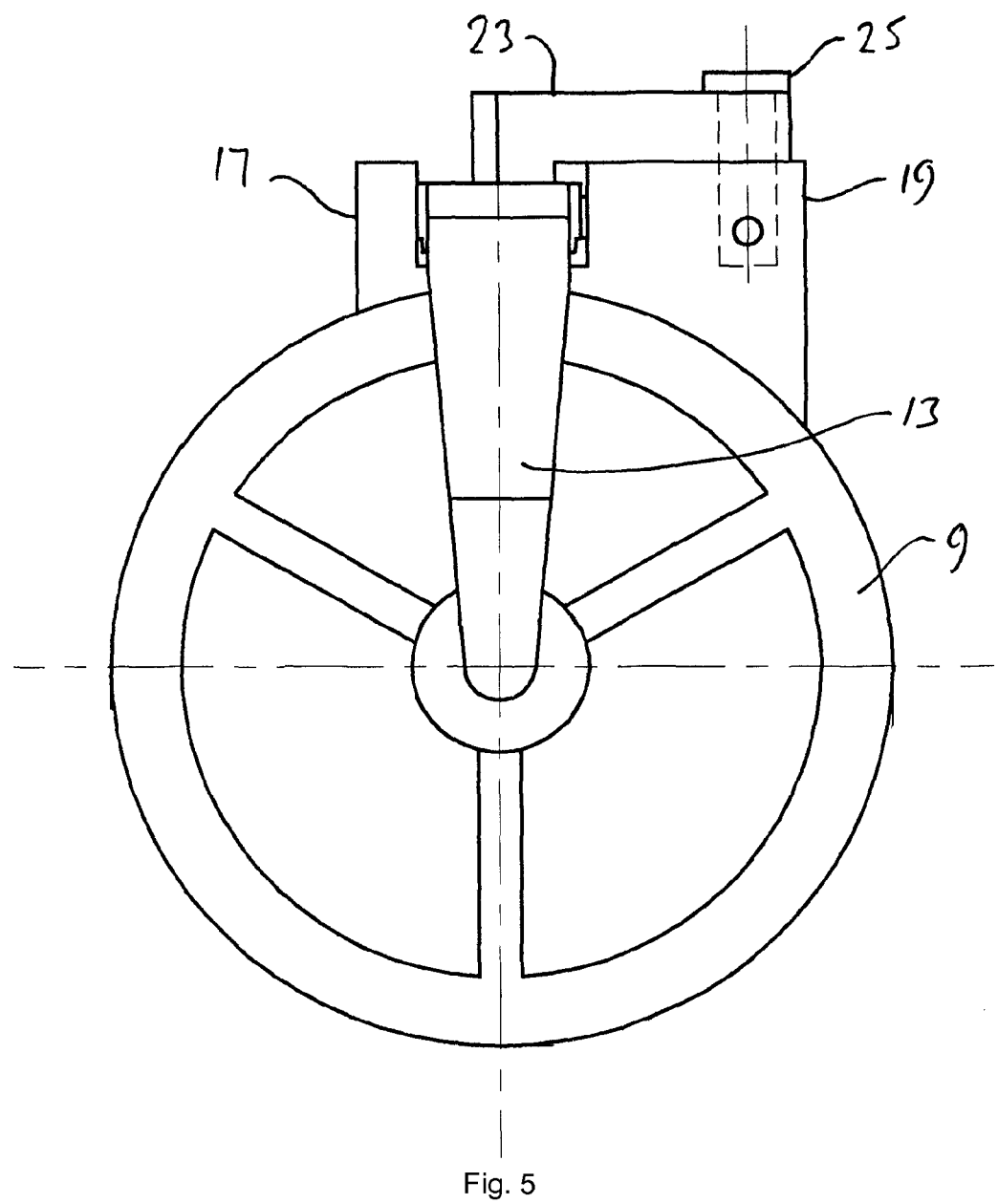
FIG. 5 is an end view of the non-return valve mechanism shown in FIG. 1.
Figure 6:
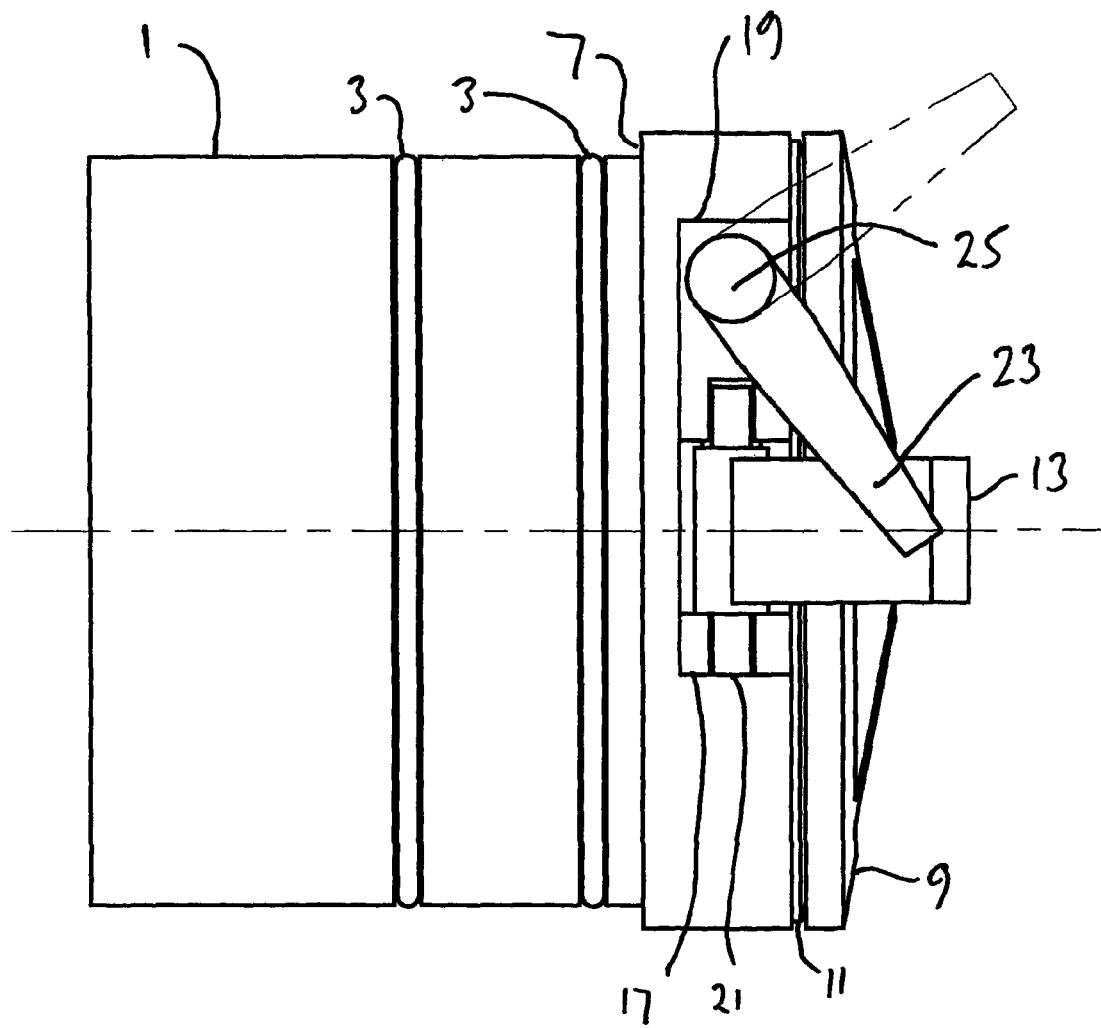
FIG. 6 is a top view of the non-return valve mechanism shown in FIG. 1.

The non-return valve mechanism, or anti-flood valve mechanism, shown in FIGS. 1 to 6 comprises a tubular member 1 which has a substantially cylindrical external surface and a substantially cylindrical inner surface provided with an outwardly tapering region 2 at an end of the valve mechanism remote from a closure member. Thus the wall thickness of the tubular member 1 decreases progressively towards a free end thereof remote from the closure member so as to improve fluid flow through the tubular member 1. The external surface of the tubular member 1 is formed with two axially spaced circumferential grooves, each of which contains an O-ring seal 3. The tubular member 1 therefore has a substantially constant external diameter which allows the tubular member to be inserted into a pipe 5, such as a household sewer pipe, from an open end of the pipe while the tubular member is a close fit within the pipe, with the O-ring seals sealing between the tubular housing and the pipe. In practice, the valve mechanism, including the tubular member, is made in a number of sizes with the tubular housing being dimensioned to be a close fit within a range of pipes 5 having standard diameters.

The end of the tubular member 1 remote from the tapering region 2 is closed by a substantially circular closure member 9. The closure member is dimensioned to bear against an end of the tubular member 1 by way of an annular seal 11 which is mounted on the closure member. The closure member 9 is supported on an operating arm 13 by way of a ball and socket connection 15 which, when the closure member is against the end of the tubular member, lies substantially on the axis of the tubular member and which allows the closure member to move relative to the operating arm. The operating arm 13 incorporates an elbow such that the arm extends substantially radially from the ball and socket connection to a location externally of the tubular member and then extends substantially in the axial direction of the tubular member to a position laterally adjacent to an external surface of the tubular member. The operating arm 13 is pivotally mounted on the tubular member 1 by way of a pair of mounting posts 17, 19 provided externally of the tubular member 1 and a pivot rod 21 which extends between the mounting posts in a direction transverse to the axial direction of the tubular member and passes through an end of the operating arm 13 or is formed integrally therewith. In practice the pivot rod 21 extends substantially horizontally.

The tubular member is formed with a circumferential shoulder 7 in a region adjacent to the closure member 9, which shoulder abuts substantially against an end of the pipe 5 into which the valve mechanism is inserted.

A locking member 23 is pivotably mounted on mounting post 19, the locking member being pivotable about an axis substantially perpendicular to the axis of the pivot rod 21. The locking member 23 is mounted on the mounting post 19 by way of a pivot pin 25. The locking member 23 can be pivoted between a first position in which the locking member bears against the operating arm 13, in particular that part thereof which extends in the axial direction of the tubular member 1 so as to maintain the closure member 9 in sealing contact with the end of the tubular member, and a second position in which the closure member is able to pivot about the pivot rod 21 towards and away from the end of the tubular member 1.

In use of the anti-flood valve mechanism shown in FIGS. 1 to 6, the tubular member is inserted into a pipe 5 providing outflow from a premises and which opens into a conventional manhole or the like. The valve mechanism is positioned between the benching (the shape created in and/or on the sides of the manhole) and is then slid and/or pushed into the pipe 5 through the wall of the manhole towards the premises within the pipe 5. That is the valve mechanism is pushed into the end of the pipe from an open end thereof. The diameter of the tubular member is a close fit within the pipe and the O-ring seals 3 form a fluid-tight seal with the internal surface of the pipe. The closure member 9 bears lightly against the end of the tubular member 1, but allows fluid flow from the pipe and through the valve mechanism into the manhole or the like. There is no requirement for modification of the manhole or the like and no requirement to provide a new or additional manhole or inspection chamber.

In the event of a flood, the water level in the manhole rises, for example due to water flowing in from the sewer system, but water pressure against the closure member 9 urges the closure member against the end of the tubular member and prevents flow into the tubular member and therefore into the pipe 5 and potentially into domestic and other premises, for example, by way of a toilet.

Alternatively, if a flood is predicted, the closure member 9 can be urged manually against the end of the tubular member and the locking member 23 can be operated to maintain the closure member in sealing contact with the end of the tubular member 1 so as to maintain the closure member 9 in sealing contact with the end of the tubular member.

The locking member 23 also allows the closure member 9 to be sealed for flow testing purposes.

In addition to preventing the entry of water, the anti-flood valve mechanism also prevents the passage of pests, such as rodents and/or snakes, and also provides an odour seal to prevent the passage of foul odours from the manhole or the like back into a property.

Figure 7:
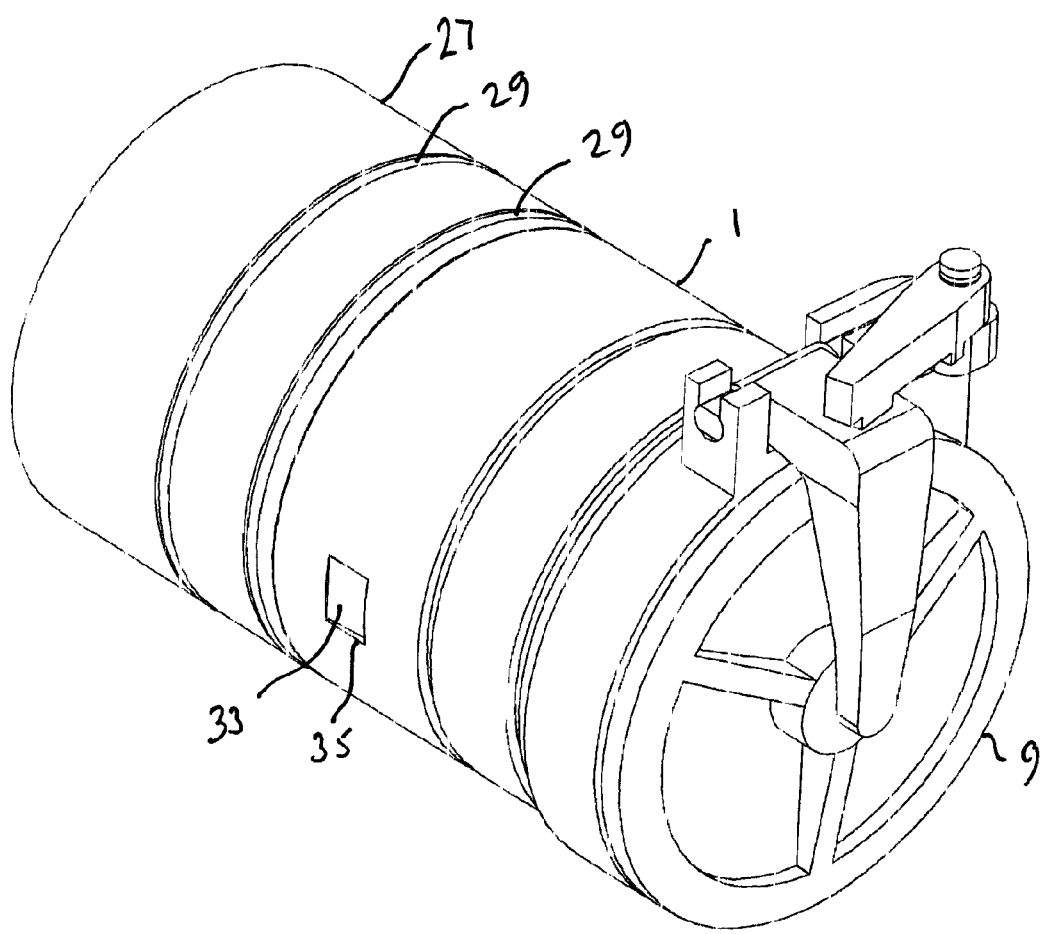
FIG. 7 is a perspective view of another embodiment of a non-return valve mechanism according to the present invention.
Figure 8:
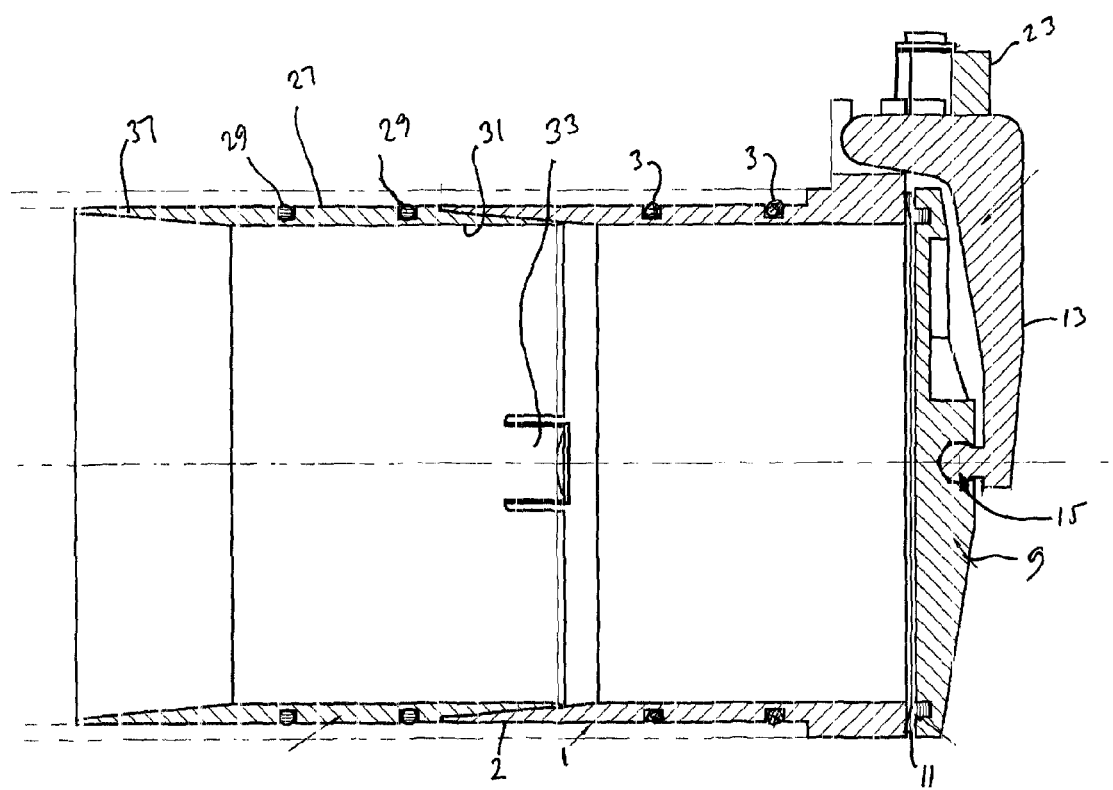
FIG. 8 is a cross-sectional view of the non-return valve mechanism shown in FIG. 7.
Figure 9:
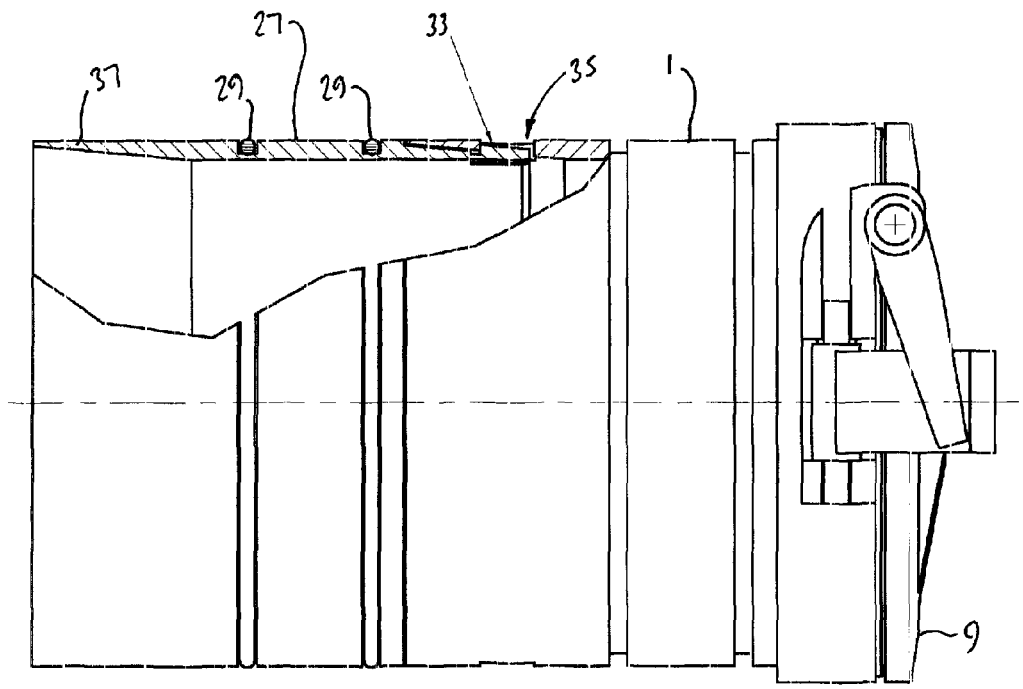
FIG. 9 is a side view of the non-return valve mechanism shown in FIG. 1.

The non-return valve mechanism, or anti-flood valve mechanism, shown in FIGS. 7 to 9 is similar to that shown in FIGS. 1 to 6 and the same references are used to denote the same or similar parts. The anti-flood valve mechanism of FIGS. 7 to 9 includes an extension tube 27 which is mounted to that end of the tubular member 1 remote from the closure member 9. The extension tube 27 has substantially the same internal and external diameters as the tubular member 1 and is formed with two axially spaced circumferential grooves, each of which contains an O-ring seal 29. Consequently, the extension tube has a substantially constant external diameter which allows the extension tube to be inserted into the pipe 5, while the extension tube 27 is a close fit within the pipe 5 with the O-ring seals 29 sealing between the extension tube and the pipe 5.

That end of the extension tube 27 adjacent to the tubular member 1 is formed with an inwardly tapering region 31 which complements the outwardly tapering region 2 of the tubular member 1 such that the inwardly tapering section 31 lies adjacent to the outwardly tapering region 2. The extension tube 27 is secured to the tubular member 1 by way of a pair of catches 33 formed on the extension tube 27 and engaging with apertures 35 formed in the tapering region 2 of the tubular member 1. The free end of the extension tube 27 is formed with an outwardly tapering region 37 such that the wall thickness of the extension tube 27 decreases progressively towards the free end of the tube 27 remote from the tubular member 1.

Thus, the extension tube 27 serves to extend the anti-flood valve mechanism in its axial direction and allows the valve mechanism to be mounted more securely in a pipe 5.

Figure 10:
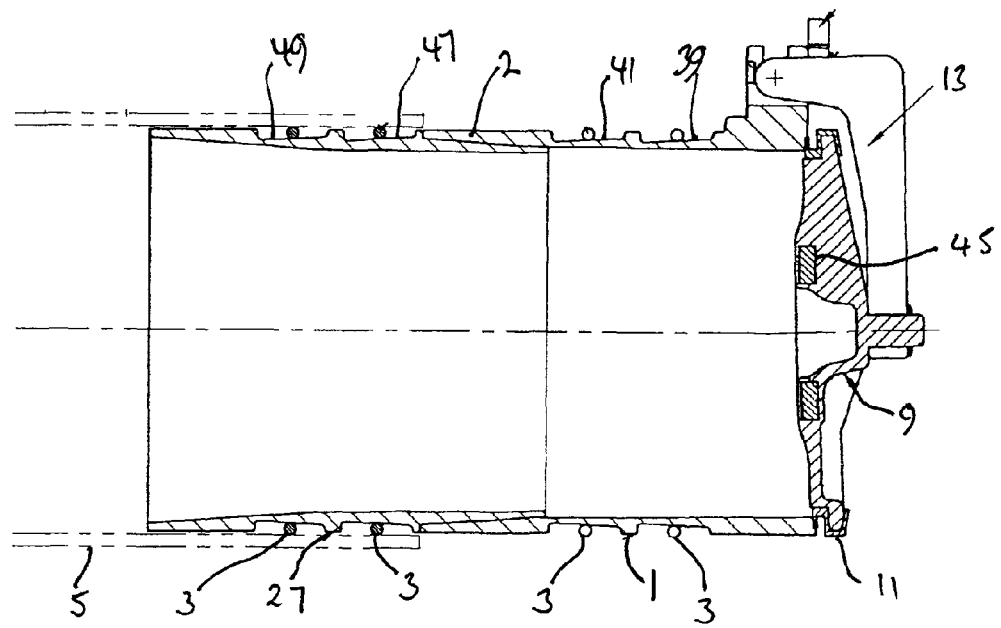
FIG. 10 is a cross-sectional view of a further embodiment of a non-return valve mechanism according to the present invention.
Figure 11:
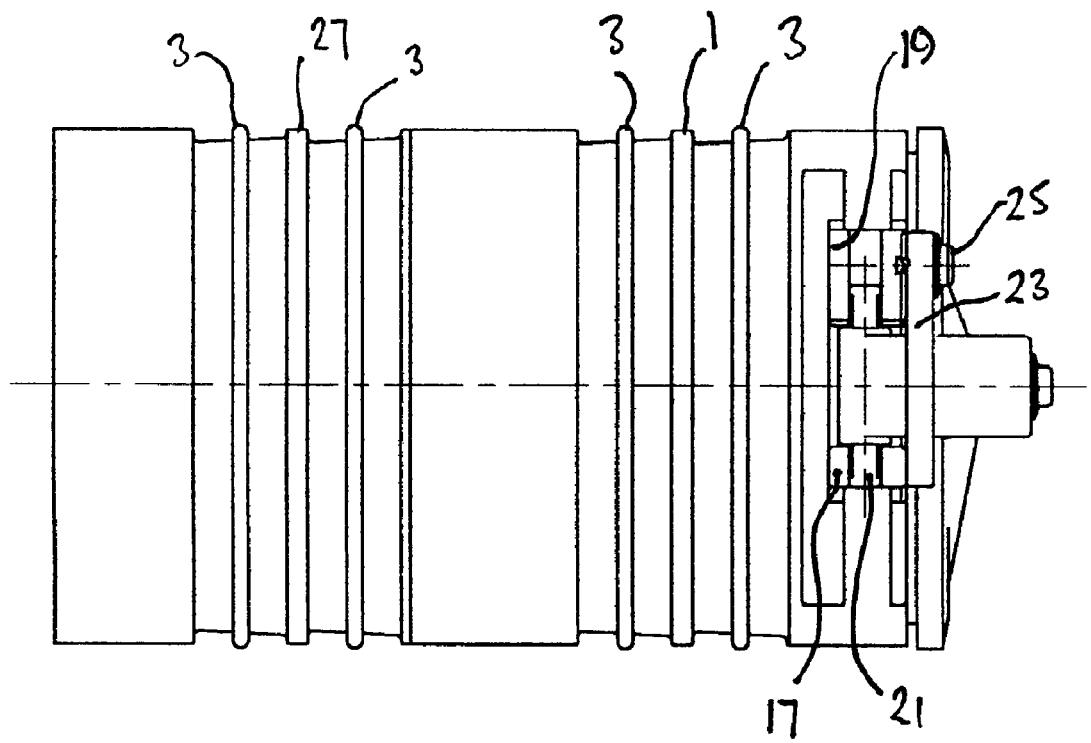
FIG. 11 is a top view of the non-return valve mechanism shown in FIG. 10.
Figure 12:
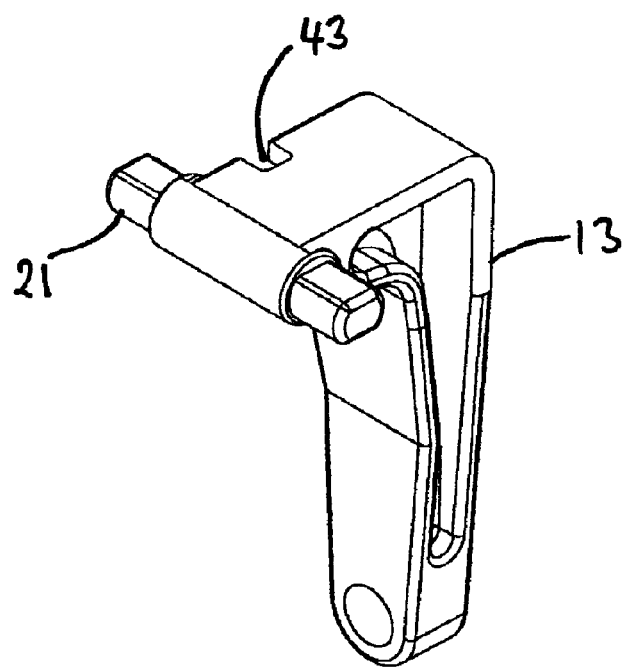
FIG. 12 is a perspective view of an operating arm forming part of the non-return valve mechanism shown in FIG. 10.

The non-return valve mechanism, or anti-flood valve mechanism, shown in FIGS. 10-12 incorporates a number of modifications compared with the anti-flood valve mechanisms of FIGS. 1 to 6 and 7 to 9. The various features of the anti-flood valve mechanism of FIGS. 10-12 are interchangeable with the features of the anti-flood valve mechanisms of FIGS. 1 to 6 and 7 to 9. The same references will be used in FIGS. 10-12 to denote the same or similar parts to those in FIGS. 1 to 6 and FIGS. 7 to 9.

The anti-flood valve mechanism of FIGS. 10-12 comprises a tubular member 1 which has a substantially cylindrical external surface and a substantially cylindrical inner surface provided with an outwardly tapering region 2 at an end of the valve mechanism remote from a closure member. Thus, the wall thickness of the tubular member 1 decreases progressively towards a free end thereof remote from the closure member so as to improve fluid flow through the tubular member 1. The external surface of the tubular member 1 is formed with two axially spaced circumferential grooves 39, 41, each of which contains an O-ring seal 3. The grooves 39, 41 are substantially wider than the diameter of the O-ring seal, for example five to six times the diameter of the seal, and are tapered such that the depth of the grooves 39, 41 increases as the distance from the closure member increases. The angle of the taper may be, for example, about 3 degrees. The tubular member 1 therefore has a substantially constant external diameter which allows the tubular member to be inserted into pipe 5 from an open end of the pipe, while the tubular member is a close fit within pipe 5, with the O-ring seals sealing between the tubular housing and the pipe.

The effect of the tapered grooves is that, when the anti-flood valve mechanism is installed, the seals are able to move, for example roll, in an axial direction of the tubular member 1 towards the closure member thereby urging the seals more tightly against the inner surface of a pipe into which the anti-flood valve mechanism is being installed with the result that the seals are, in effect, locked between the tubular member and the pipe.

The end of the tubular member 1 remote from the tapering region 2 is closed by a substantially circular closure member 9. The closure member is dimensioned to bear against an end of the tubular member by way of an annular seal 11 which is mounted on the closure member. As can be seen, especially from FIG. 10, is that the seal 11, in cross-section, is substantially S-shaped such that the seal envelopes the outer periphery of the closure member and is formed with a radially outwardly extending flange spaced axially from the peripheral region of the closure member and which engages and seals against the end of the tubular member. Such an arrangement has been found to be more effective in preventing leakage past the seal. To further improve sealing of the closure member 9 against the end of the tubular member 1, the end of the tubular member is not perpendicular to the axis of the tubular member, but is inclined relative to the perpendicular direction, for example by about 5 degrees, such that the top of the tubular member is set back relative to the bottom thereof and the weight of the closure member contributes to the sealing effect thereof. The closure member 9 incorporates a relatively higher specific gravity component, such as a metal (e.g., steel) washer 45, compared with the remainder of the closure member. The high specific gravity component acts as a counterweight so as to urge the closure member into sealing contact with the end of the tubular member 1. The washer 45 may be moulded into the closure member 9.

The closure member 9 is supported on an operating arm 13 by way of a suitable connection which allows a degree of relative movement between the operating arm and the closure member. The operating arm 13 is shown in more detail in FIG. 12 and incorporates an elbow such that the arm extends substantially radially from a central post of the closure member to a location radially outwardly of the tubular member and then extends substantially in the axial direction of the tubular member to a position laterally adjacent to an external surface of the tubular member. The operating arm 13 is pivotally mounted on the tubular member by way of a pair of mounting posts 17, 19 provided externally of the tubular member 1 and a pivot rod 21 which extends between the mounting posts in a direction transverse to the axial direction of the tubular member and passes through or is formed integrally with the operating arm 13. In practice the pivot rod 21 extends substantially horizontally.

The tubular member 1 is formed with a circumferential shoulder 7 in a region adjacent to the closure member 9. The shoulder abuts substantially against the end of the pipe 5 into which the valve mechanism is inserted.

A locking member 23 is pivotably mounted on mounting post 19, the locking member being pivotable about an axis substantially perpendicular to the axis of the pivot rod 21 and substantially parallel to the axial direction of the tubular member 1. The locking member is mounted on the mounting post 19 by way of a pivot pin 25. The locking member can be pivoted between a first position in which part of the locking member engages with a recess 43 formed in the axially extending portion of the operating arm 13 in order to lock the closure member 9 in sealing contact with the end of the tubular member 1. Such an arrangement ensures full and reliable opening and closing of the closure member 9.

As with the embodiment of FIGS. 7 to 9, the non-return valve shown in FIGS. 10 to 12 includes an extension tube 27 which is releasably mounted on that end of the tubular member 1 that is remote from the closure member 9. As illustrated, the extension member 27 has substantially the same internal and external diameters as the tubular member and is formed with two axially spaced circumferential grooves 47, 49 which are of the same configuration as the grooves 39, 41 of the tubular member 1. Thus, the extension tube 27 has a substantially constant external diameter which allows the extension tube to be inserted into pipe 5 from an open end thereof, while the extension tube is a close fit within the pipe. Where the extension tube is provided, O-ring seals 3 are provided in the grooves 47, 49 of the extension tube and optionally in the grooves 39, 41 of the tubular member 1. It is not essential for O-ring seals to be provided in the grooves of both the extension tube 27 and of the tubular member 1. Although the extension tube 27 is shown as having substantially the same internal and external diameters as the tubular member 1, extension tubes 27 may be provided having different external diameters, both larger and smaller than the external diameter of the tubular member 1, in order to adapt the tubular member 1 to pipes of slightly different internal diameters.

The invention claimed is:

1. A non-return valve mechanism comprising a tubular member (1) having an external periphery with a substantially constant external diameter whereby the tubular member can be inserted into a pipe (5) from an open end thereof, a pivotable closure member (9) provided at one end of the tubular member for closing the one end of the tubular member the closure member being adapted to be positioned externally of the pipe, at least one first seal (3) extending around the external periphery of the tubular member for sealing with an internal surface of the pipe into which the tubular member is inserted, and an annular second seal (11) mounted on the closure member (9) such that the closure member (9) bears against an end of the tubular member (1) by way of the annular second seal (11), the annular second seal (11) being substantially S-shaped in cross-section whereby the second seal envelopes a peripheral region of the closure member (9) and includes a radially outwardly extending flange portion for sealing against the end of the tubular member (1).

2. A valve as claimed in claim 1, wherein two axially spaced first seals (3) are provided.

3. A valve as claimed in claim 1, wherein the at least one first seal (3) comprises an O-ring seal mounted in a circumferential groove (39, 41) formed in the external surface of the tubular member (1).

4. A valve as claimed in claim 3, wherein the diameter of the circumferential groove (39, 41) is tapered in an axial direction of the tubular member (1), the diameter of the groove decreasing with increasing distance from the closure member (9).

5. A valve as claimed in claim 1, wherein the tubular member (1) is formed with a circumferential shoulder (7) in a region adjacent to the closure member (9) for abutting against an end of a pipe (5) into which the valve mechanism is inserted.

6. A valve as claimed in claim 1, wherein the inner surface of the tubular member (1) is tapered at an end (2) thereof remote from the closure member (9) to facilitate fluid flow through the tubular member.

7. A valve as claimed in claim 1, wherein the closure member (9) incorporates a component (45) of relatively higher specific gravity than the remainder of the closure member so as to act as a counterweight and thereby urge the closure member into sealing contact with the end of the tubular member (1).

8. A non-return valve mechanism comprising a tubular member (1) having an external periphery with a substantially constant external diameter whereby the tubular member can be inserted into a pipe (5) from an open end thereof, a pivotable closure member (9) provided at one end of the tubular member for closing the one end of the tubular member, the closure member being adapted to be positioned externally of the pipe, at least one first seal (3) extending around the external periphery of the tubular member for sealing with an internal surface of the pipe into which the tubular member is inserted, and a locking member (23) adapted to releasably lock the closure member (9) in sealing contact with the one end of the tubular member (1), the locking member (23) engaging with a recess (43) formed in an operating arm (13) for the closure member (9) so as to lock the closure member.

9. A valve as claimed in claim 8 wherein the locking member (23) bears against an operating arm (13) for operating the closure member (9) so as to lock the closure member.

10. A valve as claimed in claim 8, wherein two axially spaced first seals (3) are provided.

11. A valve as claimed in claim 8, wherein the closure member (9) incorporates a component (45) of relatively higher specific gravity than the remainder of the closure member so as to act as a counterweight and thereby urge the closure member into sealing contact with the end of the tubular member (1).

12. A non-return valve mechanism comprising a tubular member (1) having an external periphery with a substantially constant external diameter whereby the tubular member can be inserted into a pipe (5) from an open end thereof, a pivotable closure member (9) provided at one end of the tubular member for closing the one end of the tubular member the closure member being adapted to be positioned externally of the pipe, and at least one first seal (3) extending around the external periphery of the tubular member for sealing with an internal surface of the pipe into which the tubular member is inserted, wherein the tubular member (1) is provided with an extension tube (27) releasably mounted on an end of the tubular member remote from the closure member and secured to the tubular member (1) by way of one or more catches formed on one of the extension tube and the tubular member and engaging in corresponding apertures formed in the other of the extension tube and the tubular member.

13. A valve as claimed in claim 12, wherein the extension tube (27) is provided with one or more first seals (3) extending around the external periphery thereof.

14. A valve as claimed in claim 13, wherein two axially spaced first seals (3) are provided.

15. A valve as claimed in claim 13, wherein the one or more first seals (3) comprises an O-ring seal mounted in a circumferential groove (47, 49) formed in the external surface of the extension tube (27).

16. A valve as claimed in claim 15, wherein the diameter of the circumferential groove (47, 49) is tapered in an axial direction of the tubular member (1), the diameter of the groove decreasing with increasing distance from the closure member (9).

17. A valve as claimed in claim 12, wherein the inner surface of the extension tube (27) is tapered at that end thereof remote from the tubular member (1) to facilitate fluid flow through the extension tube.

18. A valve as claimed in claim 12, wherein the inner surface of the tubular member (1) is tapered at that end (2) thereof remote from the closure member (9) to facilitate fluid flow through the tubular member, and wherein the outer surface of the extension tube (27) is formed with a complementary taper such that the portion of the extension tube having the complementary external taper lies adjacent to the internal tapered region (2) of the tubular member (1).

19. A valve as claimed in claim 12, wherein two axially spaced first seals (3) are provided.

20. A valve as claimed in claim 12, wherein the closure member (9) incorporates a component (45) of relatively higher specific gravity than the remainder of the closure member so as to act as a counterweight and thereby urge the closure member into sealing contact with the end of the tubular member (1).

* * * * *